Nov. 7, 1950 — R. W. BRADLEY ET AL — 2,528,491

SHOEMAKING APPARATUS

Filed Dec. 24, 1947 — 4 Sheets-Sheet 1

Inventors
Robert W. Bradley
Richard C. Wildman
By their Attorney

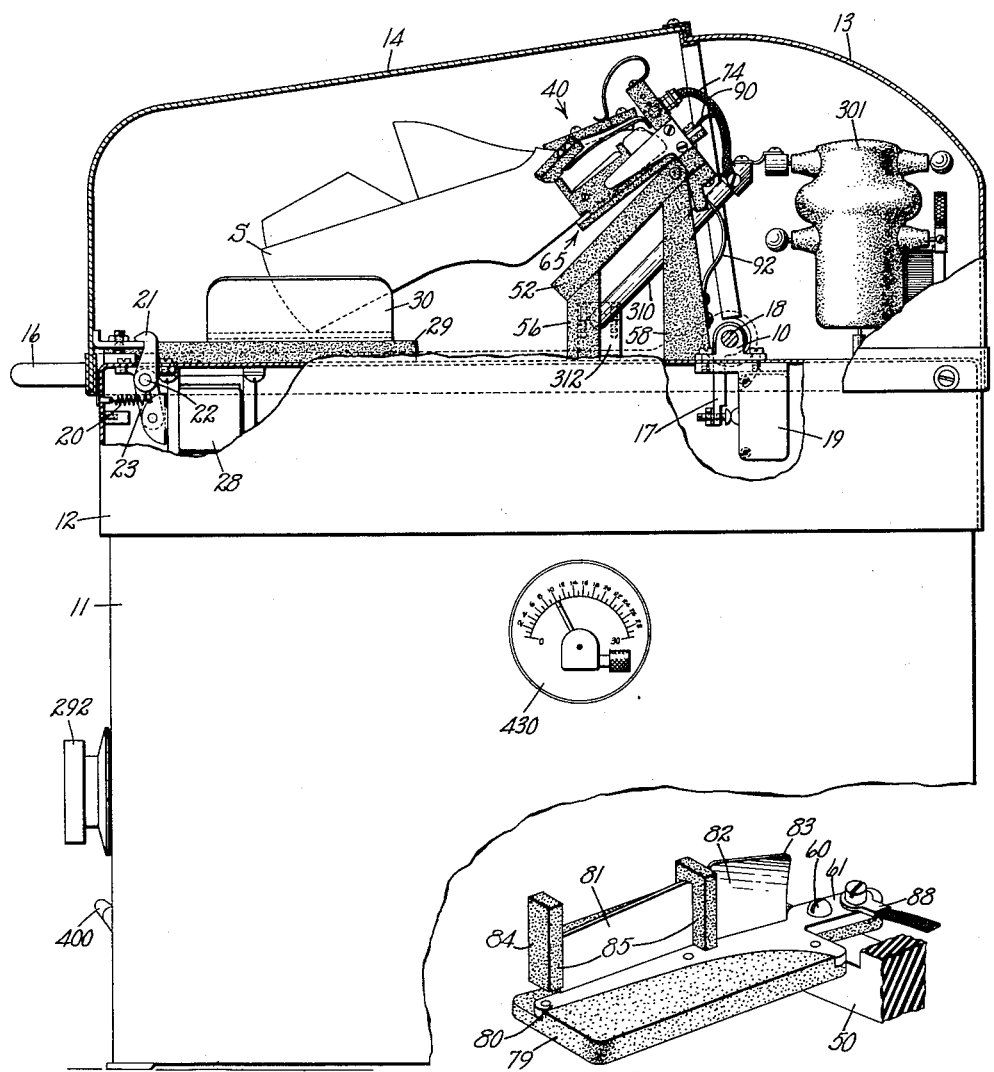

Nov. 7, 1950  R. W. BRADLEY ET AL  2,528,491
SHOEMAKING APPARATUS
Filed Dec. 24, 1947  4 Sheets-Sheet 3
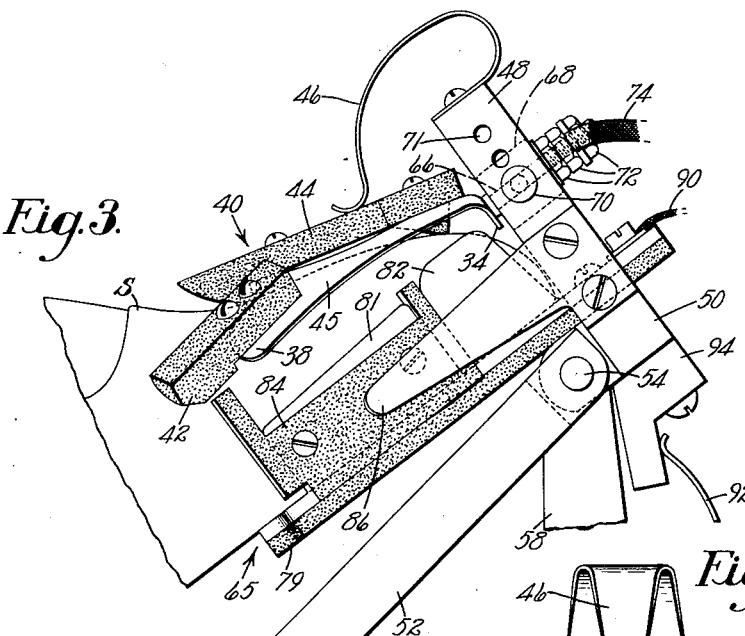
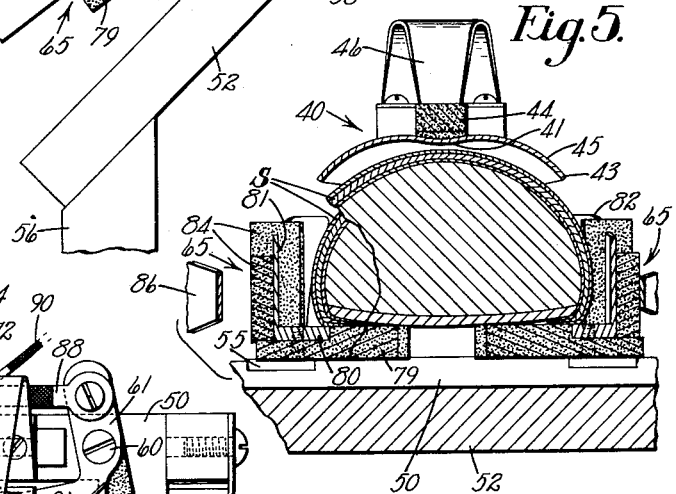
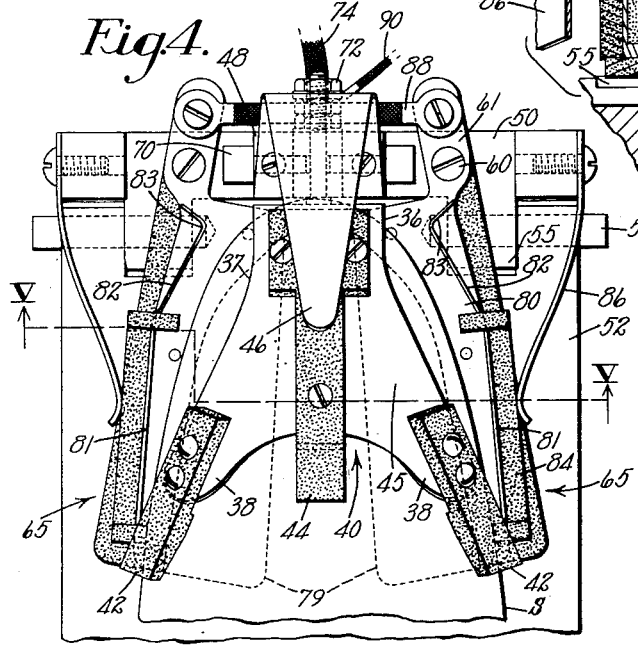
Inventor
Robert W. Bradley
Richard C. Wildman
By their Attorney

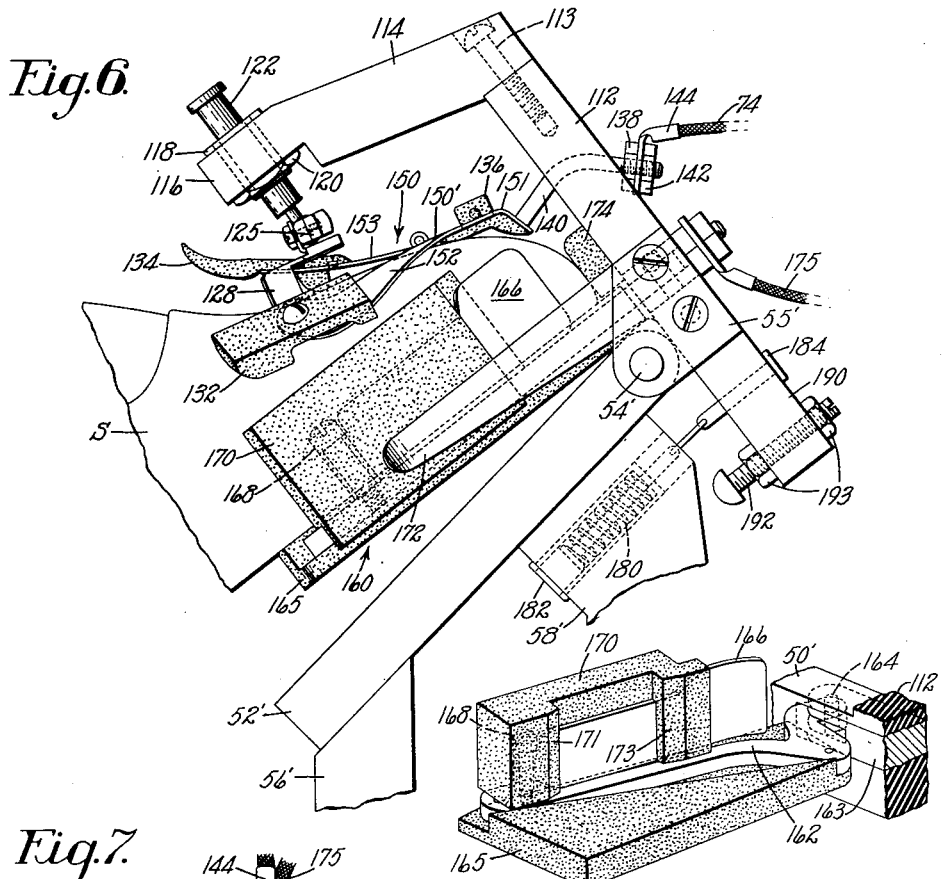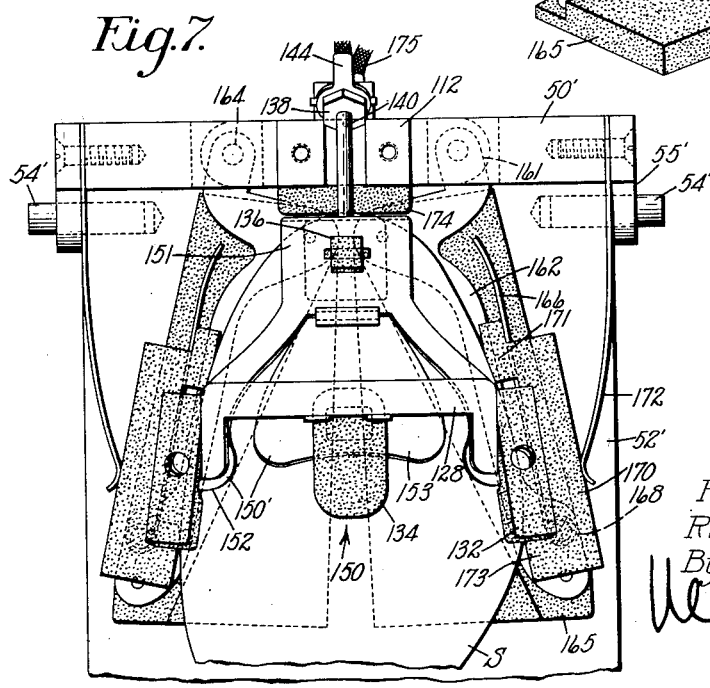

Patented Nov. 7, 1950

2,528,491

UNITED STATES PATENT OFFICE 2,528,491

SHOEMAKING APPARATUS

Robert W. Bradley, Marblehead, and Richard C. Wildman, Manchester, Mass., assignors to United Shoe Machinery Corporation, Flemington, N. J., a corporation of New Jersey Application December 24, 1947, Serial No. 793,720

25 Claims. (Cl. 12—1)

This invention relates to apparatus for making shoes, and more particularly to apparatus for supplying heat to thermoactive material incorporated in the toe portions of shoes by means of high-frequency electric fields.

In the manufacture of shoes it is frequently desirable to stiffen the toe portions of the shoes as by means of a toe box. One method of stiffening a toe portion of a shoe is to include, between the layers of the upper materials, a preformed blank of stiff material such as fibre-board. We prefer another method wherein limp, thermoactive stiffener material is incorporated in the upper between the lining and the doubler during the assembly of the upper and prior to the pulling-over and lasting operations. The material remains limp during these processes and may thereafter be hardened or set through heat activation, in exact conformity with the last. Preferably the heat for activation is provided by the effect of high-frequency electric fields since this method, by generating the heat in the material itself, permits more rapid heating of the material without injury to the shoe than could be achieved by the external application of heat. During the following discussion, the stiffener material will be referred to as thermosetting but it will be understood that the invention is also applicable to thermoplastic and like materials.

In order to stiffen a thermosetting toe uniformly by high-frequency electric fields, it is necessary to provide a uniform field density throughout the areas to be activated. Furthermore, a poorly balanced field has a tendency to arc over at high energy levels. Where the objects to be treated vary in included angles and cross-sectional areas as different sizes and shapes of shoes are encountered, an electrode found suitable for some shoes lacks efficiency and uniformity when applied to others.

It is, accordingly, an object of the invention to provide improved apparatus by means of which stiffener materials incorporated in the toe portions of shoe uppers prior to lasting may be uniformly and rapidly activated by means of a high-frequency electric field.

Another object of the invention is the provision of apparatus for such activation wherein the shoes to be treated may be more conveniently positioned in the apparatus for treatment and which will accommodate a wide range of sizes of shoes.

A feature of the invention resides in the provision of an improved machine for activating thermosetting material incorporated in the toe portion of a shoe upper. This machine has a novel arrangement and design of electrode organization to which the toe of a shoe may be presented and by which, when appropriately energized, the toe portion may be activated in a substantially uniform manner. For this purpose the electrode organization includes two electrodes, one a U-shaped electrode, the other a cooperative electrode element. The U-shaped electrode is designed to bracket the sides of the shoe toe substantially parallel to the shoe bottom and is divided into two segments pivoted to receive between them the toes of shoes of different sizes. In accordance with another feature of the invention, to provide uniform activation throughout the shoe toe, portions of each segment of the U-shaped electrode have been given an L-shaped cross-section so that by disposing the bottom edge of the shoe within the angle of the L the overlasted margin of the upper and the sides of the toe are within a substantially uniform electric field. The cooperative electrode element has a tongue-like member extending over the tip of the shoe toward the tip line. In one modification, a flap hinged to the member at the rear of the element promotes its accommodation to different shapes of box toes.

Both of these electrodes are provided with spacers which hold the electrodes in properly spaced relation to the shoe. By another feature of the invention, all portions of these spacers except certain shoe-engaging portions are outside the direct electric field to avoid arcing from the spacers and to avoid disturbing the field.

The toe of a shoe to be activated is presented to the electrode organization and the heel end of the shoe, in accordance with a feature of the invention, is held by a V-shaped trough. As shown, this trough is provided with soft side walls to avoid scarring the shoe.

This trough has a fixed relation to the machine and shoes of different lengths will engage it at different spots, thus changing the angle of elevation of the forepart of the shoe at the electrodes. Accordingly, another feature of the invention provides for the mounting of the electrode organization so that it will nod to accommodate different vertical angles of presentation.

These and other features of the invention to be defined in the claims are described in detail in the following specification in connection with the accompanying drawings in which, Fig. 1 is a view in front elevation of a box toe activating machine embodying the invention;

Fig. 2 is a view partly in side elevation and partly in section of the aforesaid activating machine, showing a shoe positioned for the activation of the box toe and illustrating cover latches and a cover safety switch to be described;

Fig. 3 is an enlarged elevation of the electrode portion of the machine with the toe of a shoe positioned between the segments of a U-shaped electrode for activation;

Fig. 4 is a plan view of the electrode organization and shoe shown in Fig. 3;

Fig. 5 is a view of the electrode organization and shoe in section substantially on line V—V of Fig. 4;

Fig. 5a is an angle view of one segment of the U-shaped electrode of Fig. 3;

Fig. 6 is a right elevation of a modified electrode organization showing the toe of a shoe in position between the segments of a U-shaped electrode for activation;

Fig. 7 is a plan view of the modified electrode organization and shoe with the support for the cooperative electrode element removed; and Fig. 7a is an angle view of one segment of the U-shaped electrode of Fig. 6.

Figure 1:
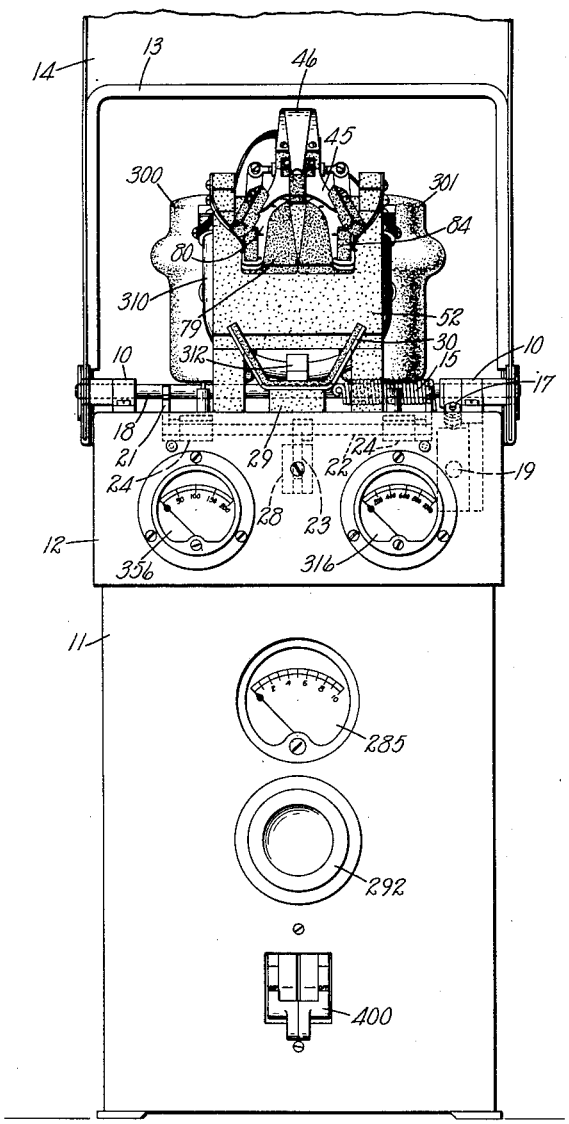

Referring to Figs. 1 and 2, the machine comprises generally a lower section or cabinet 11 containing a power supply and an upper section or chassis 12 on and within which are mounted the components of a high-frequency oscillator, and on which are mounted the box-toe activating electrodes and shoe-holding elements. To provide safety for the operator and to prevent radiation from the electrical system, means for enclosing the top of the chassis is provided by a housing comprising a stationary hood 13 and a movable cover 14 having a handle 16. The cover 14, shown open in Fig. 1 and closed in Fig. 2, is mounted on the chassis 12 by a rod 18 rigidly attached to the cover and journaled in brackets 10 secured to the chassis. Torque is yieldingly supplied to the rod 18 by a spring 15 so that the cover is normally held open. When the cover 14 is in its closed position, an arm 17 on the rod 18 contacts and closes a normally open switch 19 in the primary circuit of a high voltage transformer of the oscillator power supply.

The cover is held closed during operation by cover latches 21 which engage with lips on the cover. These latches are mounted on the ends of a rod 22 journaled in bearings 24 affixed to the chassis 12 and are yieldingly urged from engagement with the cover 14 by a spring 20. A solenoid 28 is mounted to pull on an arm 23 in opposition to the spring. The solenoid is arranged to be energized during operation and when so energized, the solenoid overcomes the force of the spring and causes the latches to engage the cover and lock it shut.

A sheet metal heel trough 30 is mounted on the top of chassis 12 on a plastic block 29. The walls of the trough are lined with sponge rubber and are inclined outwardly to receive and frictionally engage the heel end of any of a large variety of sizes and shapes of lasted shoes, such as that shown at S in Fig. 2, against lengthwise slipping and transverse tipping.

Electrodes between which an electric field may be set up are shown in one embodiment of the invention in Figs. 3, 4, 5 and 5a, respectively, and in another embodiment in Figs. 6. 7 and 7a. In both embodiments, because shoes of different lengths may engage the heel trough at different spots and thus be presented to the electrodes at different angles of elevation, provision is made for pivoting the electrode organization to nod to receive shoes at such angles. To accomplish this object, both embodiments of the electrodes are mounted on a horizontally disposed hinge portion 50, 50′ (Figs. 4 and 7) pivoted at the top edge of an inclined plastic slab 52, 52′ on pins 54, 54′ which pass through alined apertures in corner portions 55, 55′ of the hinge portion. In general, the spacers and other non-conductive portions of the electrode organization are fabricated from a suitable dielectric plastic material, such as polytetrafluoroethylene, which is referred to herein by the word plastic. The plastic slab is mounted in a sloping position at the rear of the chassis 12 on front legs 56, 56′ (Figs. 3 and 6) and rear legs 58, 58′.

In the first embodiment the U-shaped electrode 65 is positioned with its open end toward the front of the apparatus and comprises two segments each having an elongated metal arm 80 curved to extend along the bottom edge of a shoe substantially from the shoe tip to the tip line, and heightwise metallic extensions or fins 81 and 82 attached to and arising from the outer edge of the arm to extend alongside the toe. The forward upper corner 83 of each fin 82 is bent inwardly to contour the fin to the toe of a shoe (Figs. 4, 5a). The arm of each segment is screwed into grooves in a flat, plastic bottom piece 79 which serves to support the shoe and space the bottom margin of the shoe heightwise from the electrode. Each segment with its bottom piece is pivoted on the hinge portion 50 by screws 60 which pass through holes in lug portions 61 of the arms. The lug portions provide spaced pivot points so that the segments may be spread in correct alinement to accommodate various widths of shoe toes. The segments are yieldingly urged against the shoe by leaf springs 86 bearing against plastic spacers 84 which are attached to the outside surface of the fins 81. Each spacer has inwardly extending portions 85 to engage the surface of a shoe at either end of fin 81 to hold the electrode in correct relation to the shoe. In Fig. 4 only the frontmost spacers are shown in engaging position, but it will be understood that the manner of engagement differs with different shapes and sizes of shoe toes.

These engaging portions, in accordance with another feature of the invention, are outside the direct field generated by fins 81 and 82 so that a minimum distortion of the electric field is caused by the presence of the spacers. The segments are electrically connected together at the rear of the electrode organization by a cable 88 so that the two segments provide a bi-segmental, U-shaped electrode to extend around and alongside the toe of a shoe substantially parallel to the shoe bottom to encompass or bracket the sides of the toe. In accordance with a feature of the invention, portions of this electrode are effectively L-shaped in cross-section (Fig. 5) so that in operation the bottom margin of the shoe may be disposed within the angle of the L to uniformly heat the bottom margin and sides of the toe as previously described. The electrode is connected to the oscillator by a power cable 90.

The cooperative electrode element 40 comprises a conductive tongue-like member 45 generally triangular in outline shape mounted to extend over the toe of a positioned shoe from the shoe tip to its tip lineee. Near its shoe tip end, the member is pivotally supported for vertical motion by the plastic cuboid 68 through which passes a metallic stud 66, one end of which is rigidly attached to the end 34 of the member and the other end of which is threaded to receive nuts 72 and a power cable 74 which connects the member to the oscillator. The cuboid is pivoted on pins 70 between two uprights or risers 48 attached to the hinge portion 50. Several sets of alined holes 71 in the risers for the pins provide for the heightwise adjustment of the element to accommodate shoe toes of different heights. At its shoe tip end, the member has a short waist portion 36 of substantially uniform width. As it extends toward the tip line, the member widens out at 37 and ends in two short rounded leg portions 38. The member is cupped so as to be generally contoured heightwise to the convex contour of the toe, but the contour is not exact since it has been found that a more uniform distribution of heating in the toe is achieved when the member is not strictly conformed to the surface of the shoe, but rather is depressed toward the shoe along its median line 41 and is bent slightly toward the surface of the shoe along its edges 43, thereby to present to the shoe two symmetrical concave areas (Fig. 5). Spacers 42 attached to the leg portions 38 extend therefrom to engage the surface of a shoe outside the direct electric field to hold the member from contact with the toe at the tip line. A spacer 44 is attached along the median line of the member to engage the shoe at the tip line and also at the tip of the shoe. This spacer also receives the pressure of a leaf spring 46 which bears upon it to hold the electrode element down on the shoe.

As previously stated, the whole electrode organization by virtue of its common mounting on the hinge portion 50 can nod about the pins 54 to receive shoes at different vertical angles. For convenience in presenting shoes thereto, the organization is normally held in an up-tilted position by a spring 92 pressing on an arm of a block 94 attached to the hinge portion.

In another embodiment of the invention illustrated in Figs. 6, 7 and 7a, the U-shaped electrode 160 comprises two segments each having an elongated metallic arm 162 curved to extend along the bottom edge of a shoe substantially from the shoe tip to the tip line, and a heightwise metallic fin 166 mounted to extend along the sides of the shoe toe substantially coextensively with the arm. Each arm is screwed into a groove in a flat plastic bottom piece 165 serving as a bottom spacer, and the arm is pivotally mounted to the hinge portion 50' by a pin 164 which passes through a hole in a lug portion 161 of the arm. The arms are connected together and to the oscillator by a metallic link piece 163 (Fig. 7a) and a power cable 175. Each fin is attached to an arm near its tip-line end by a screw 168 to pivot inwardly or outwardly. A plastic spacer 170 attached to the outside of each fin has inwardly extending end portions 171, 173 which engage the side of the shoe under the inward thrust of a leaf spring 172 attached to the hinge portion 50' so that the arms and fins of each segment are pressed to the shoe in properly spaced relation and the segments form a U-shaped electrode to bracket the sides of the shoe toe. A toe block 174 abutting two risers 112 and attached to the hinge portion provides a gage for the proper lengthwise positioning of the shoe.

The cooperative electrode element 150 of this embodiment comprises a tongue-like member 150' having a relatively narrow and short waist portion 151 part of which near the shoe tip end of the member is bent down toward the shoe. The member has two leg portions 152 which extend and spread from the waist portion toward the tip line of a shoe. The element additionally comprises a flap member 153 pivoted to the waist portion of the tongue-like member for vertical movement between the leg portions. Plastic spacers 132 are attached to the leg portions and spacer 134 to the flap portion to engage the surface of a shoe toe near the tip line. A spacer 136 is attached at the waist portion to engage the tip of the toe. Power is supplied to the electrode element from the oscillator through a connector 140, one end of which is rigidly attached to the tip of the waist portion 151 of the tongue-like member and the other end of which is connected to lug 144 of a cable 74 by nuts 138 and 142. As shown in Fig. 7, the lug 144 abuts against the risers 112 to hold the electrode element 150 from rearward displacement.

This element depends only upon its weight to hold it down upon the shoe but it is held against substantial horizontal displacement by attachment to a rod 122 vertically slidable in a sleeve 118 which is secured through an arm 114 by a nut 120. Screws 113 secure the arm 114 to the risers 112. At its lower end, the rod is attached to the electrode element by a yoke 128, the ends of which are fastened to the leg portions of the tongue-like member. A ball and socket connection 125 between the rod and the yoke provides a freely pivoting joint, so that the electrode element readily positions itself on the shoe toe.

The electrode organization is normally held in an up-tilted position by a spring 180 mounted in a brass housing 182 in the leg 50', the housing preventing the spring from picking up radio-frequency energy. The spring pulls on a headed stud 184 in an arm 190 attached to the hinge element 50'. A bolt 192 through the lower end of the arm 190 and secured in place by nuts 193 provides an adjustable stop rest to determine the up-tilted position.

The oscillator components shown in Figs. 1 and 2 comprise tubes 301 and 302 with an anode tank loop 310 grounded centrally by a metal block 312 together with associated meters 316 and 356 while the power supply components shown comprise a main circuit breaker 400, a voltage control 292, a meter 285 and a timer relay 430. The timer relay 430 is manually set to the desired treating period after which it automatically opens.

In operation, the operator finds the machine with its cover 14 held open by spring 15, and the electrode organization tilted up to a substantially horizontal position. To this organization he presents the toe of a shoe to be treated, moving it forward against the risers 48 and pressing its heel lightly into the heel trough 30. Assuming that the machine has previously been "warmed up" by closing breaker 400, the operator may now adjust the timer relay 430 to the desired heating period and close the cover which, if all is well, will be held closed by latches 21 until the end of the heating period at which time the opening of the timer switch shuts off the high-voltage power to the oscillator. At the same time solenoid 29 is de-energized to release the latches and allow the cover to spring open. By manipulating knob 292 the operator can control the rate at which the toe is heated.

Having thus described our invention, what we claim as new and desire to secure by Letters Patent of the United States is:

1. In a high-frequency heating apparatus for activating the toe box stiffener of a lasted shoe, electrode means for connection to a source of power to produce an electric field in the toe portion of a lasted shoe, said means comprising an electrode to extend around said toe portion substantially forward of the ends of the tip line, and a cooperative upper electrode element to overlie the upper mid-portion of the tip of the shoe.

2. Apparatus as in claim 1 wherein the first-mentioned electrode extends substantially parallel to the shoe bottom.

3. Apparatus as in claim 1 wherein the first-mentioned electrode is substantially L-shaped in cross-section to contain the edge of a shoe within the angle of the L.

4. In high-frequency heating apparatus for activating toe box stiffener material incorporated in a shoe, an electrode to extend around and alongside of the toe end of a shoe, a cooperative electrode element having a tongue-like member to extend over the upper surface of the toe of said shoe substantially from the end thereof to the tip line, said member being narrower at the end of the shoe than at the tip line, and means for connecting said electrodes to a source of high-frequency electric energy.

5. In high-frequency heating apparatus for activating toe box stiffener material incorporated in a shoe, an electrode to extend around and alongside of the toe end of a shoe, a cooperative electrode element to overlie the central surface of a shoe toe, said cooperative electrode comprising a metallic member of greatest width near the tip line and narrowing in width forwardly of the tip line, said member to extend approximately to the toe end of the shoe, and means for connecting said electrodes to a source of high-frequency electric energy.

6. In high-frequency heating apparatus for activating toe box stiffener material incorporated in a shoe, an electrode to extend around and alongside of the toe end of a shoe, said electrode comprising an elongated metallic strip in substantially parallel relation with the shoe bottom and a heightwise extension rising from said strip and substantially at right angles therefrom, a cooperative electrode element having a conductive tongue-like member to overlie the upper toe surface of a shoe, said member being generally conformed to said surface and generally triangular in outline shape, and means for connecting said electrodes to a source of high-frequency electric energy.

7. In high-frequency heating apparatus adapted for activating toe box stiffener material incorporated in a shoe, an electrode to extend around the toe end of a shoe, a cooperative electrode element to overlie the upper toe surface of a shoe, said cooperative electrode element having a tongue-like member generally conformed in heightwise contour to the underlying shoe surface which comprises a metallic strip of greatest width near the tip line and narrowing in width forwardly of the shoe to extend approximately to the toe end thereof, and means for connecting said electrodes to a source of high-frequency electric energy.

8. In high-frequency heating apparatus for activating toe box stiffener material incorporated in a shoe, an electrode to extend around and alongside of the toe end of a shoe, a cooperative electrode element to overlie the central toe surface of a shoe, said cooperative electrode element being generally conformed heightwise to the underlying shoe surface and comprising a conductive tongue-like member of greatest width near the shoe tip line and narrowing in width, at first rapidly and then more slowly, forwardly of said tip line to extend approximately to the tip of the toe, the wider portion of said member being depressed toward the shoe along its midline and along its edges and the toe end of said member curving downwardly approximately in conformation with the downward curvature of the toe end of the shoe, and means for connecting said electrodes to a source of high-frequency electric energy.

9. In high-frequency heating apparatus for activating toe box stiffener material incorporated in a shoe, an electrode to extend around and alongside of the toe end of a shoe, a cooperative electrode element to extend over the upper surface of the toe of said shoe substanially from a point near the end thereof to the tip line, said first-named electrode being bi-segmented and mounted for widthwise separation, and said cooperative electrode element being mounted for heightwise displacement relative to said first-named electrode, thereby permitting the insertion of the toe ends of shoes of different sizes and widths between said electrodes, and means for connecting said electrodes to a source of high-frequency electric energy.

10. Apparatus as in claim 8 comprising additionally spring means cooperating with said electrodes to urge them inwardly.

11. In high-frequency heating apparatus for activating toe box stiffener material incorporated in a shoe, an electrode organization including an elongated electrode to extend around and alongside of the toe end of a shoe, and a cooperative electrode element to extend over the upper surface of the toe of said shoe substantially from the end thereof to the tip line, said organization being pivotally mounted to nod to receive shoe toes presented at different elevation angles, and insulating members mounted in fixed relation to said electrodes for maintaining the latter in operative position relative to the toe end of a shoe.

12. In apparatus for the activation of a toe box stiffener piece incorporated in the toe end of a shoe, an electrode organization including electrodes to produce an electric field in a shoe toe, said organization being mounted to nod to receive shoe toes at different vertical angles, and a heel rest spaced from said organization and having inclined opposed walls between which the heel of a shoe presented to the organization may be wedged to hold the shoe against lengthwise slipping and transverse tipping.

13. Apparatus as in claim 12 wherein additionally said walls are lined with yieldable elastic material.

14. In high-frequency apparatus for activating a piece of stiffener material incorporated in a shoe, an electrode member positioned outside the shoe adjacent to said piece, a cooperating electrode, an insulating spacer member mounted on said electrode member to engage the surface of said shoe to maintain a predetermined spacing of said electrode member from the shoe, said insulating member being mounted on the outside surface of said electrode member and having limited portions only thereof extending inwardly to engage the shoe at at least one point substantially out of the path of the field passing directly from said electrode member into said stiffener piece and to the cooperating electrode, thereby to minimize the disturbance of the field caused by said insulating spacer member.

15. In apparatus for electronic heating of an end of a shoe, a U-shaped electrode to bracket the side faces of an end of a shoe, a cooperative electrode element mounted to lie adjacent to another region of said end, and means for conducting high-frequency electric power to said electrodes.

16. In apparatus for heating shoe toes by high-frequency electric power, a U-shaped electrode to bracket the side faces of a shoe toe, a cooperative electrode element mounted to lie adjacent to another region of said toe, and means for conducting high-frequency electric power to said electrodes.

17. Apparatus as in claim 16 in which said cooperative electrode element is mounted to overlie the central portion of the toe of said shoe.

18. Apparatus as in claim 16 in which said U-shaped electrode is characterized by having portions thereof L-shaped in cross-section so that in operation the bottom margin of a shoe may be disposed within the angle of the L.

19. In high-frequency heating apparatus for activating toe box stiffener material incorporated in a shoe upper, a U-shaped electrode to bracket the side faces of the toe portion of a shoe by extending adjacent thereto substantially parallel to the shoe bottom, a cooperative electrode element to extend adjacent to and substantially to overlie the center of the toe portion of said shoe, and means for connecting said electrodes to a source of high-frequency electric energy.

20. In high-frequency heating apparatus for activating toe box stiffener material incorporated in a shoe upper, a segmented electrode to extend around the side faces of the toe end of a shoe substantially parallel to the shoe bottom, a cooperative electrode element to overlie the upper mid-portion of the tip of the shoe, and means for connecting said electrodes to a source of high-frequency electric energy.

21. In high-frequency heating apparatus for activating thermosetting material incorporated into the toe of a shoe, a U-shaped electrode having a plurality of segments at least two of which are pivoted to bracket the side faces of the toe end of a shoe substantially parallel to the sole, a cooperative electrode element extending over the central portion of the shoe toe and comprising a tongue-like member having a relatively narrow waist-portion at the tip of the shoe, two leg-portions spreading and extending from opposite of said waist-portion substantially to the tip line of the shoe, and a flap-portion pivoted to said waist-portion between said leg-portions, and means for connecting said electrodes to a source of high-frequency electric energy.

22. In apparatus for activating thermosetting box toes by high-frequency electric energy, a bisegmented electrode to bracket the sides faces of the toes of various sized shoes comprising two symmetrical arms each pivoted near one end and electrically connected to each other so that together they constitute a substantially continuous U-shaped conductor to extend around the toe end of a shoe adjacent to the bottom edge thereof, said electrode additionally comprising metal upright side fins on said arms, spring means to urge the arms inwardly, dielectric spacers on said arms adjacent to said fins to hold them in predetermined spaced relation to a shoe therebetween, a cooperative electrode element to extend over the central area of the shoe tip, and means for connecting said electrodes to a source of high-frequency electric energy.

23. In apparatus of the class described, in combination, an electrode adapted to bracket the end of a shoe and cooperate with another electrode in establishing an electric field in said end, said electrode comprising two electrode members disposed to lie adjacent to the shoe upper above the sole on opposite sides of said end, and means for supporting said members in such disposition, said means providing for one of said members a mounting pivot by which the member may swing bodily toward and away from the other member.

24. In apparatus of the class described, in combination, an electrode mounted to bracket the end of a shoe, a cooperative cupped electrode element mounted to lie adjacent to another region of said end, and means for connecting said electrodes to a source of high-frequency electric energy.

25. In apparatus of the class described, in combination, a U-shaped electrode adapted to cooperate with the toe end of a shoe and positioned with its open end toward the front of the apparatus, an upright disposed at the back of the apparatus adjacent to the closed end of the U, a cooperative plate-like electrode pivoted to the upright at a point spaced heightwise from the plane of the U to overlie the space enclosed by the U, whereby a shoe toe may be disposed between said electrodes with its bottom margin adjacent to the U-shaped electrode and its top surface adjacent to the plate-like electrode, and means for conducting high-frequency current to said electrodes.

ROBERT W. BRADLEY.
RICHARD C. WILDMAN.

REFERENCES CITED

The following references are of record in the file of this patent:

UNITED STATES PATENTS

| Number | Name | Date |
|---|---|---|
| 2,000,936 | Duplessis | May 14, 1935 |
| 2,151,756 | Fletcher et al. | Mar. 28, 1939 |
| 2,293,851 | Rogers | Aug. 25, 1942 |
| 2,295,690 | Russell et al. | Sept. 15, 1942 |
| 2,363,364 | Rugg | Nov. 21, 1944 |
| 2,396,004 | Gilbert | Mar. 5, 1946 |